Jan. 31, 1939. J. F. WILCOX 2,145,702
BEER TAP
Filed Oct. 29, 1937
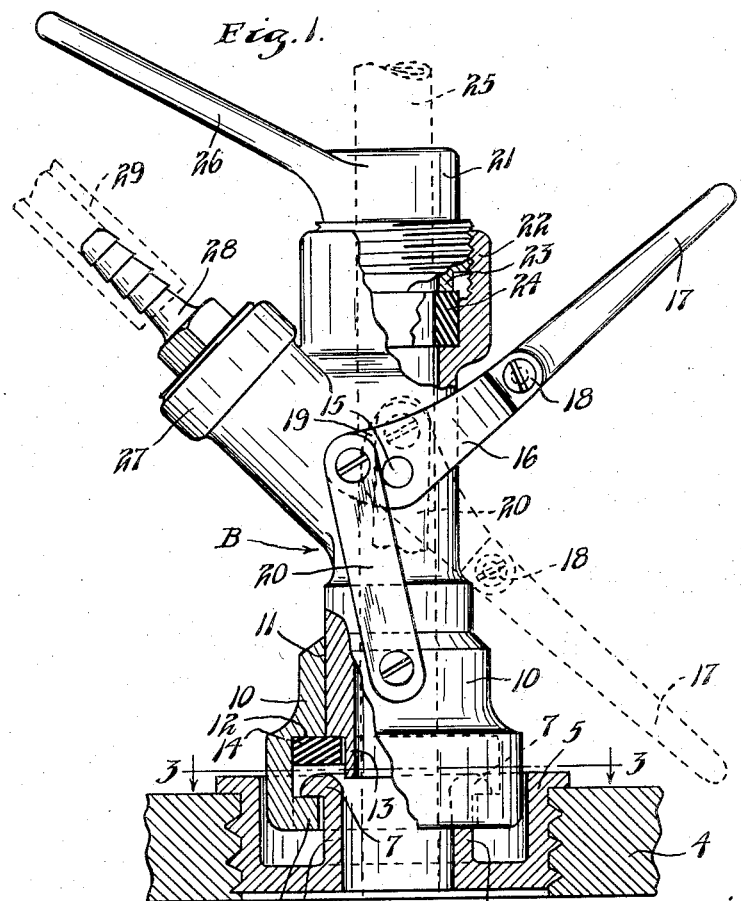
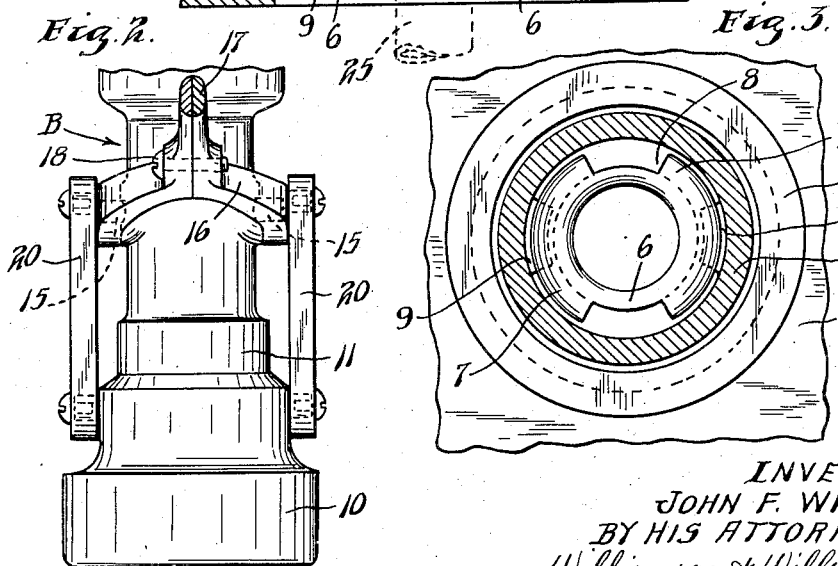
INVENTOR.
JOHN F. WILCOX.
BY HIS ATTORNEYS.
Williamson & Williamson Patented Jan. 31, 1939

2,145,702

UNITED STATES PATENT OFFICE 2,145,702

BEER TAP

John F. Wilcox, Minneapolis, Minn., assignor to Superior Products Manufacturing Company, Minneapolis, Minn., a corporation of Minnesota Application October 29, 1937, Serial No. 171,733

1 Claim. (Cl. 285—39)

This invention relates generally to devices for making convenient connection with a container, and more particularly to devices for tapping beer kegs and the like so that beer may be withdrawn from the keg into the line which conveys the beverage to the dispensing apparatus at the bar.

There have been various types of beer taps designed heretofore, and many of them are so constructed that they can be manipulated to tightly press a sealing gasket or washer between the lip of a bung and the lower portion of the tap to prevent leakage of liquid or the compressed gas which is introduced into the keg to force the contents therefrom. The common practice in constructing taps is to provide a substantially cylindrical body with a relatively axially movable collar at its lower end, this collar being generally known as a tap lug. A screw thread connection is made between the tap lug and the tap body and a sealing washer is mounted within the lower portion of the lug so that the body can be moved downwardly relative to the lug after the lug has been initially secured to the bung, so that the lower portion of said body will press the sealing washer or gasket tightly downwardly against a lip defining an opening in said bung. While a screw operated tap lug has been found to effectively compress the sealing washer to form a tight joint, it has also been found that because of the screw thread construction the tap is often destroyed because of the fact that users thereof will almost universally use a heavy instrument such as a hammer to strike against ears extending from one of the screw threaded operating elements to firmly press the tap body down against the sealing washer and the bung. The tap, therefore, becomes quickly mutilated and unfit for use. Furthermore the sealing washer which is made of rubber is subjected to such excessive and unnecessary distortion that it quickly becomes worn out and must be replaced. In addition the force exerted by the cooperating threaded elements must be transformed into a relatively rectilinear force, and this requires guide ways or similar expedients on the body of the tap and on the tap lug, and results in additional labor in connection with the production thereof.

The general aim of my invention is, therefore, to eliminate the use of cooperating threaded elements for urging the tap body downwardly to sufficiently compress the sealing washer to form a seal against the escape of liquid or gases at the point of connection.

Another object of the invention is to provide means for exerting a downward pressure upon the tap in a substantially straight line and to limit the pressure which can be exerted to a predetermined amount of pressure which is not only sufficient to form an effective seal, but which is limited to a maximum to prevent excessive destructive pressures both upon the sealing washer and the tap itself.

Another object of the invention is to provide a tap which is firmly locked in its attached position and which will not become loosened under pressure from within the container or through vibration or jostling, but which can be quickly and easily released when desired.

These and other objects and advantages of the invention will be more fully set forth in the following description made in connection with the accompanying drawing, wherein like reference characters refer to the same or similar parts throughout the various views, and in which:—

Fig. 1 is a side elevation of a tap with certain portions broken away to show interior construction and with a portion of a container and a bung;

Fig. 2 is an elevation taken at right angles to Fig. 1 with certain parts broken away, and Fig. 3 is a transverse section taken on the line 3—3 of Fig. 1.

In the particular embodiment of my invention shown in the drawing, there is diclosed a fragmentary portion 4 of a keg head having a bung element 5 threadedly secured therein. The structure of the bung is conventional and in common use in the brewing industry today. It will be noted that the bung is centrally apertured and that said aperture is defined by a cylindrical wall structure 6 which has at its free edge a lip or seat 7. This lip 7 is provided with a pair of notches 8 which are adapted to receive a pair of small oppositely disposed projecting lugs 9 which extend inwardly from a more or less cylindrical sleeve like main tap lug 10. The small lugs 9 are slipped into the notches 8 in the lip of the bung, and rotation of the tap lug 10 will cause the small lugs 9 to slip beneath the lip for an initial relatively loose engagement of the tap lug 10 with the bung.

The tap lug 10 is axially bored, as is clearly shown in Fig. 1, and slidably receives the smooth bottom portion 11 of the tap body B. The lower portion of the tap body terminates in a shoulder 12 and an extending portion 13, the shoulder and the surface of the extending portion being in engagement with certain surfaces of a rubber sealing washer 14 which is normally retained within a recessed portion of the tap lug 10. It will be seen in Fig. 1 that the washer 14 is positioned between the shoulder on the lower portion of the top body and the upper surface of the lip 7 on the bung 5.

Extending from opposite portions of the tap body is a pair of pivots 15 which may be formed integrally with said body and which pivotally support a yoke 16 forming part of an operating handle 17. If the pivot pins 15 are formed integrally with the tap body, it is desirable to construct the yoke and handle in two parts so that they may be easily mounted upon the pivots. In that case a bolt or rivet 18 is used to secure the complementary parts of the yoke and operating handle. It will be noted in Fig. 1 that the operating yoke has a cam-like extension 19 adjacent its pivot 15, and this extension is, in turn, pivotally connected to a link 20 on either side of the tap body. The lower end of each link is, in turn, pivotally connected to the upper portion of the tap lug 10. Therefore when the operating handle and yoke are in the full line position shown in Fig. 1, the top body B will be in the raised position shown, relative to the tap lug 10 and the bung lip 7. However, when the tap lug has been initially relatively loosely secured to the bung lip 7 and the operating handle 17 has been pressed downwardly to the dotted line position shown in Fig. 1, the tap body will be moved downwardly to firmly compress the rubber washer 14 between the shoulder 12 on the lower end of the tap body and the lip 7 on the bung 5. This will firmly secure the tap device to the bung and effectively seal the connection between the tap and the bung against any leakage. The dotted line position of the operating handle and yoke and a portion of one of the links 20 clearly shows that the upper pivot point of the links 20 is carried past the center line defined by the center of the tap body. In other words, the upper pivot point of the links 20 is carried around beyond a vertical line drawn between the lower pivot points of the links 20 and the pivots 15 of the yoke 16. This forms a positive lock against accidental dislodgment of the operating handle except by actual manipulation of said handle. It is apparent that although a positive lock is provided, it is absolutely unnecessary to do any hammering upon the tap to either secure it tightly or to loosen it since there is sufficient leverage in the handle 17 to carry the pivots past their points of alignment in either direction.

The remainder of the tap construction is conventional. There is, of course, an axial bore through the tap body and the upper end thereof is provided with an externally threaded collar-like part 21 which fits into the upper internally threaded portion 22 of the tap body, and which has a downward extension 23 adapted to bear against a rubber washer 24. A tap rod in the form of a hollow tube 25, shown in dotted lines in Fig. 1, is inserted through the collar-like part 21 and downwardly through the tap body into the keg 4. Thereupon the collar 21 is rotated by means of its handle 26 to compress the rubber washer 24 and cause it to engage the outer walls of the tube 25. This upper portion is generally similar to the conventional construction now known for securing the tap lug to the bung, but its use in this upper connection with the tap rod 25 does not require as much pressure and there is no likelihood of mutilation or destruction of the collar 21 and its operating handle 26 because there is no tendency to hammer upon the collar operating handle 26.

Extending from a medial portion of the tap body is an offset 27 which is adapted to receive a nipple 28 to which the end of a tube 29 is connected. The tube 29 leads from either an air compressor or a tank of gas for introducing air or other gas to the interior of the keg so that the contents of the keg will be expelled therefrom through the tap tube 25 when a suitable spigot is opened.

From the above description it will readily be seen that the disadvantages of the conventional screw type of tap and tap lug have been eliminated and I have provided a construction which will result in not only longer life of the tap, but which provides for much easier and quicker connection and disconnection of the tap and the bung. Furthermore, with the old screw type of tap, it was frequently found that in connection with the dispensing of beer the liquid would get into the threads during connection and removal of the tap, and after a tap had been connected to a keg for a short time, the beer would become tacky and cause the cooperating threaded elements to stick. This made removal of the tap rather difficult and additional hammering was resorted to. This has been eliminated with my invention since there is sufficient leverage created by the operating handle to break the tap body loose from the tap lug with very little effort.

It will, of course, be understood that various changes may be made in the form, details and arrangement of the various parts without departing from the scope of my invention.

What is claimed is:—

A threadless bung and tap assembly which obviates relative rotation between the elements thereof comprising an apertured bung having a notched flange at its upper end, a tap lug collar having a pair of inturned lugs at its lower end adapted to be received through the notches of the bung and turned to underlie the flange of the bung, a tap body on which said collar is longitudinally slidable, said body having a longitudinal bore therethrough, and a dead center lever mechanism connected between said body and said collar and operable to move said body longitudinally with respect to said lug to bring said body into sealing engagement with said bung.

JOHN F. WILCOX.